United States Patent
Logan

(10) Patent No.: US 7,095,584 B2
(45) Date of Patent: Aug. 22, 2006

(54) INTEGRATED CHEMICAL BREATHER FILTER WITH HIGH AND LOW PRESSURE SURFACES

(75) Inventor: Randy Jon Logan, Hong Kong (CN)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 10/652,675

(22) Filed: Aug. 29, 2003

(65) Prior Publication Data

US 2005/0047001 A1  Mar. 3, 2005

(51) Int. Cl.
*G11B 17/02* (2006.01)
(52) U.S. Cl. .................................................. 360/97.02
(58) Field of Classification Search ............. 360/97.02, 360/97.03; 96/134; 55/318, 324, 350.1, 55/385.2, 482
See application file for complete search history.

(56) References Cited

U.S. PATENT DOCUMENTS

| 6,208,484 B1 * | 3/2001 | Voights ............... 360/97.02 |
| 6,238,467 B1 * | 5/2001 | Azarian et al. ............... 96/135 |
| 6,266,208 B1 * | 7/2001 | Voights ............... 360/97.02 |
| 6,395,073 B1 * | 5/2002 | Dauber ....................... 96/134 |

\* cited by examiner

*Primary Examiner*—R. S. Tupper
(74) *Attorney, Agent, or Firm*—Pauly, DeVries, Smith & Deffner, L.L.C.

(57) ABSTRACT

Filters and methods of using the filters, as well as assemblies having the filters are disclosed. The present invention includes a breather filter combined with an adsorbent filter in a single enclosure that utilizes pressure differentials within the housing of an operating data storage device to provide improved contaminant removal from the enclosure

18 Claims, 5 Drawing Sheets

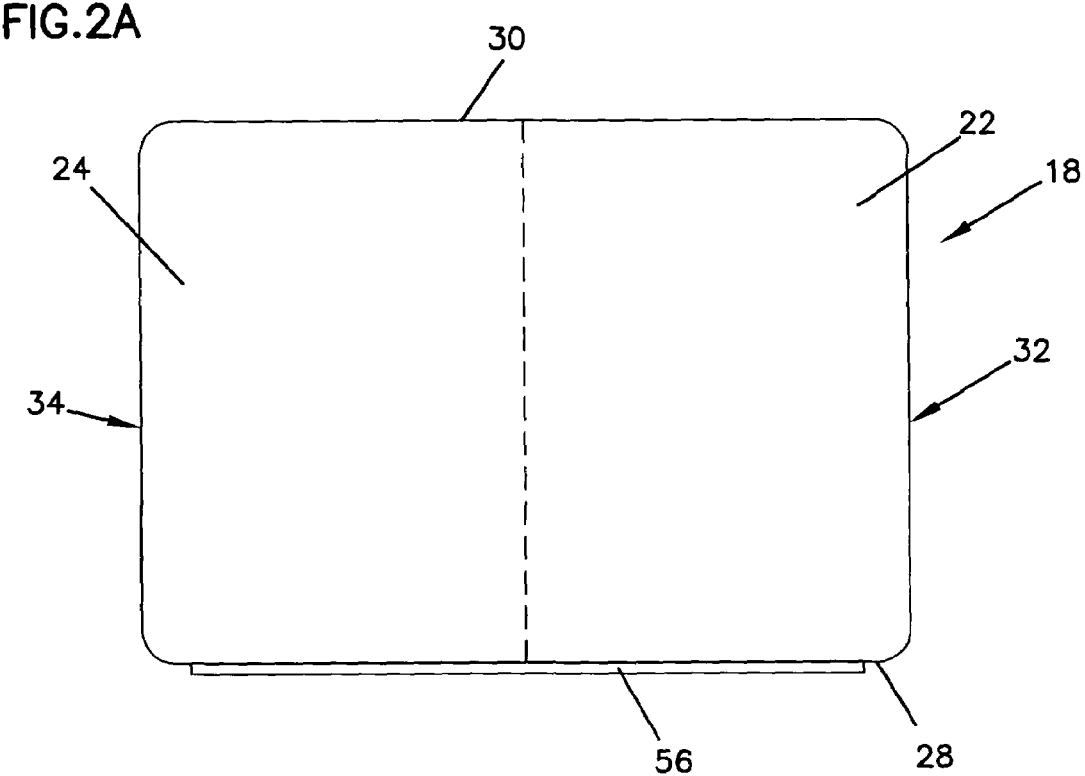
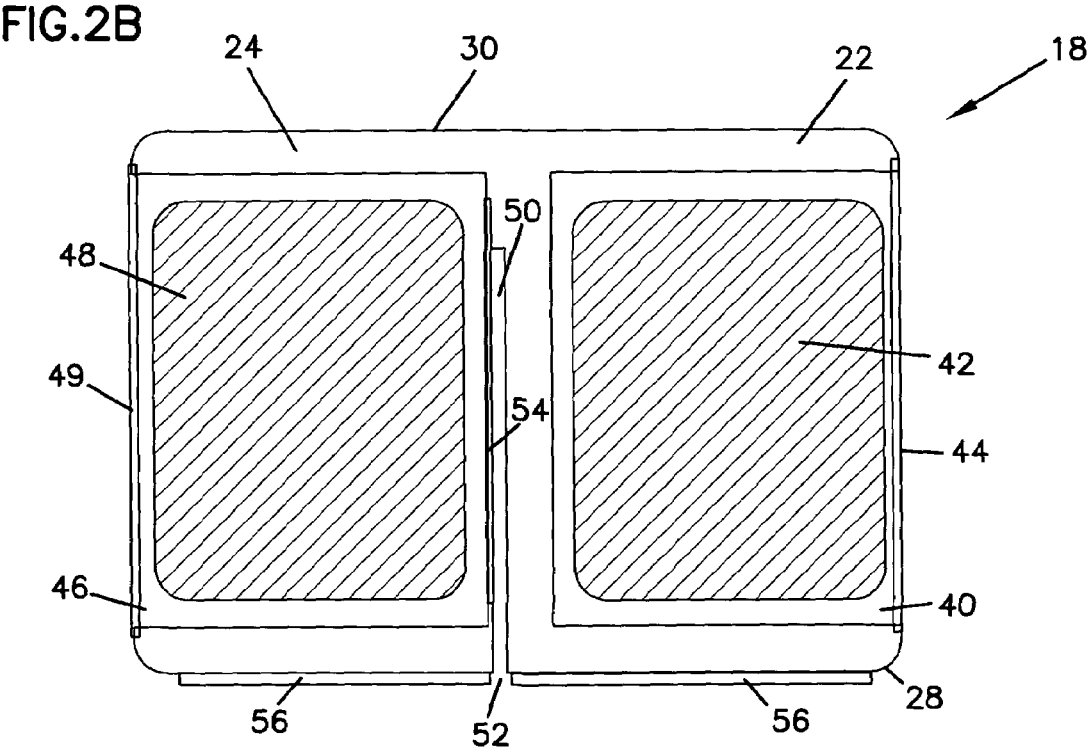

INTEGRATED CHEMICAL BREATHER FILTER WITH HIGH AND LOW PRESSURE SURFACES

FIELD OF THE INVENTION

The present invention is directed to filters and methods of using the filters, as well as assemblies having the filters. More particularly, the present invention combines a breather filter with an adsorbent filter in a single enclosure and utilizes pressure differentials within the housing of an operating data storage device to provide improved contaminant removal from the enclosure.

BACKGROUND OF THE INVENTION

Hard disk drives are enclosures in which an inflexible platter coated with magnetic material is rapidly spun. A magnetic read/write head "flies" only a few microns above the disk on an air cushion. To provide a hard disk drive having high efficiency, it is generally desirable to position the head as close to the disk as possible without touching it.

Particulate and gaseous contaminants act to reduce efficiency and longevity of hard disk drives. Common sources of contaminants in disk drives include leaks (which may or may not be intentional), the manufacturing environment, and the materials incorporated into the disk drive which give off particulates and gases. Organic vapors can be generated inside disk drive enclosures during normal operating conditions when, for example, the temperature exceeds 150° F. (about 65° C.). Such temperatures can be achieved by simply leaving the computer in the trunk of a car on a hot day.

As aerial densities of disk drives continue to increase and flying heights become smaller, disk drives are becoming increasingly sensitive to moisture, chemical contamination and particulate contamination. Chemical contaminants include hydrocarbons that can condense onto the disk and degrade the head/disk interface, and acid gases that can corrode the heads. Particulate contamination can lead to stiction of the drive head, causing read/write errors, and head crashes.

A typical method to reduce the level of contamination inside a drive is to seal the drive so that outside contaminants cannot enter. However, manufacturing methods available today make it difficult to adequately seal the drive at a reasonable cost. An alternative is to reduce leaks throughout the drive and create a breather hole in the exterior of the drive enclosure for air to enter and exit the drive during the heating/cooling cycles caused by the drive's operation. Typically a breather filter is then positioned over the breather hole to prevent contaminants from the outside from reaching the interior of the drive enclosure. Frequently, a recirculation filter is also utilized in an electronic enclosure to adsorb and/or absorb contaminants that originate within the electronic enclosure.

Therefore, a need exists for an economical filtering solution to the problems that are currently addressed by separate breather and recirculation filters.

SUMMARY OF THE INVENTION

The present invention is directed to filters and methods of using the filters, as well as to assemblies having the filters.

As a disk drive operates, the disk spins causing air currents to form inside the drive housing. Regions of higher and lower air pressure are created as these air currents encounter physical structures within the drive. Breather filters are optimally located in a zone of lower or neutral air pressure such that air is not driven out of the breather filter only to be drawn back in through a leak somewhere else in the drive housing. In contrast, recirculation filters are optimally located in the airflow path created by the rotation of the disk, generally an area of higher air pressure is generated when the moving air collides with the physical structure of the recirculation filter. As such, currently the breather filter and the recirculation filter are generally placed in separate areas within the drive enclosure, necessitating two separate filter structures. However, having two separate filters structures may result in increased manufacturing costs because the filters must be manufactured and placed in the drive enclosure separately.

The present invention combines a breather filter with an adsorbent filter in a single enclosure and utilizes high-pressure and low-pressure zones within the enclosure to provide improved contaminant removal. Filters made in accordance with the invention typically include at least two chambers, one of which functions as a breather filter and one which functions as a recirculation filter. The breather filter is located in a zone of low-pressure air and primarily removes contaminants from air entering the enclosure from the exterior environment. The recirculation filter is located in a zone of high-pressure air and primarily removes contaminants within the enclosure, such as acids generated during production of the electronic enclosure or during operation of the electronic equipment within the enclosure.

In certain implementations, filters of the present invention comprise a housing containing a base, a top, and at least one sidewall extending from the base to the top. The housing defines a first chamber and a second chamber separate from the first chamber. The first chamber functions primarily as an adsorbent filter whereas the second chamber functions primarily as a breather filter. The filter housing is configured such that the first chamber is positioned in a zone of high-pressure air and the second chamber is positioned in a zone of low-pressure air. The housing further defines at least one aperture through the sidewall into the first chamber and an inlet port and an outlet port for the second chamber. Typically, adsorbent filter media is disposed within the first chamber of the housing and breather filter media is disposed within the second chamber of the housing.

In certain embodiments, the housing defines a path for fluid flow through one aperture into the first chamber, in contact with the adsorbent material for removal of contaminants, and out through a different aperture. The housing can also define a path for the flow of fluid through the inlet port into the second chamber, into contact with the particulate filter media, and out the outlet port. A diffusion channel can couple this inlet port and the second chamber.

The housing typically comprises a non-porous material, but has a porous membrane disposed over the outlet port of the second chamber. This porous membrane can be, for example, a polytetraflouroethylene membrane. In many embodiments, a mounting adhesive is disposed on the base of the housing and aids holding the base in place.

Other features and advantages of the invention will be apparent from the following detailed description of the invention and the claims. The above summary is not intended to describe each illustrated embodiment or every implementation of the present disclosure. The detailed description that follows more particularly exemplifies certain embodiments utilizing the principles disclosed herein.

BRIEF DESCRIPTION OF THE DRAWINGS

The invention will be more fully explained with reference to the following drawings.

FIG. 2A is a side schematic diagram of a filter assembly constructed and arranged in accordance with the invention.

FIG. 2B is a cross sectional side schematic diagram of the filter assembly of FIG. 2A.

Figure 1:
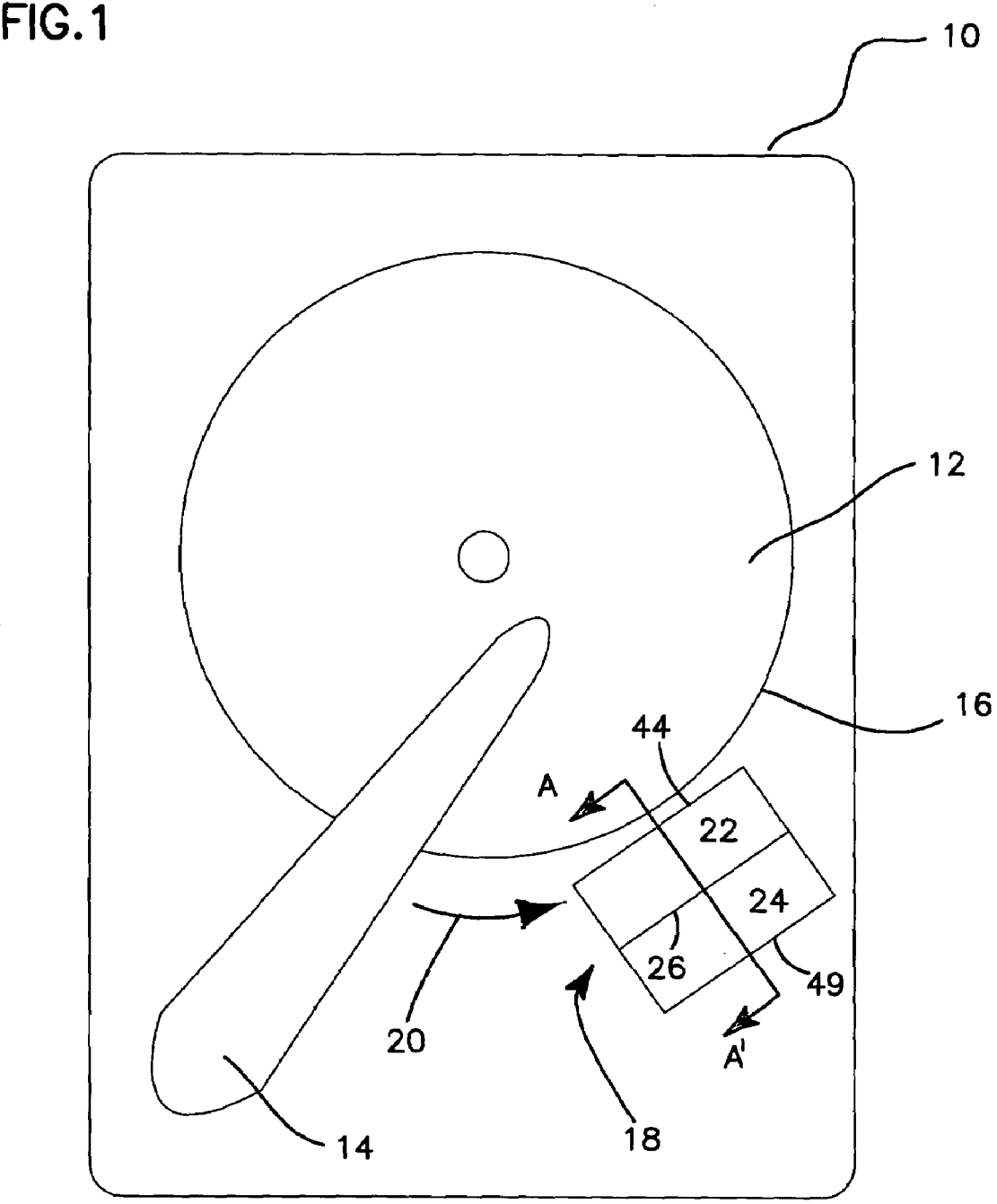
FIG. 1 is a top plan view of a data storage device incorporating the present invention.

While principles of the invention are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the disclosure and claims.

DETAILED DESCRIPTION OF PREFERRED EMBODIMENT

The present invention is applicable to filters and methods of using the filters, as well as to assemblies having the filters. In particular, the present invention relates to an assembly that combines a breather filter with an adsorbent filter in a single enclosure and utilizes high-pressure and low-pressure air zones within the housing of an operating data storage device. This assembly is capable of removing particulate and vapor contaminants from air entering the enclosure, as well as removing contaminants existing within the enclosure or found within the enclosure.

Specific applications of the invention include use with data storage devices such as computer hard disk drives, optical drives, magneto-optical drives and removable storage drives, sensitive optical systems such as cameras, optical detection devices such as microscopes or electron microscopes and venting of fiber optic junctions, sensitive electronic equipment susceptible to dirt, vapor films or corrosion such as automobile electronic control units, mobile communication or location devices, and other electronic monitoring or controlling devices, and sensitive corrosion prone components of any nature that can decay, erode, or diminish in effectiveness or value by being in contact with particles or vapor contaminants, yet still need to be vented to the outside environment to provide a controlled venting or equilibration of pressure.

Referring now to the figures, various aspects of specific implementations of the invention will be disclosed. FIG. 1 shows a top plan view of a filter assembly within an enclosure of a computer hard disk drive that needs protection from particulates and harmful vapors. Disk drive enclosure 10 contains a disk 12 that rotates, along with an armature 14 used to read and write data. At the edge 16 of the disk 12 is positioned a filter 18 constructed and arranged in accordance with the invention. An arrow 20 is shown on FIG. 1 to illustrate how airflow generally travels within the drive enclosure 10 when the disk 12 is rotating in a counter-clockwise direction.

A first chamber 22 of the filter 18 is positioned near the disk 12, while a second chamber 24 of filter 18 is positioned in a direction generally facing away from the disk 12. An interior wall 26 physically separates first chamber 22 with second chamber 24 of the filter 18. Airflow within the enclosure 10 causes zones of high and low pressure on opposite sides of the filter 18. Accordingly, first chamber 22 of the filter 18 is exposed to a higher pressure zone than second chamber 24.

FIGS. 2A and 2B are schematic side views of the filter shown in FIG. 1, which is one embodiment of a filter housing produced in accordance with the invention. FIG. 2A shows filter 18 in an exterior side view while FIG. 2B shows filter 18 in a cross-sectional side view along line A–A' of FIG. 1. First chamber 22 and second chamber 24 of the filter 18 are shown in both FIG. 2A and FIG. 2B. The filter housing 18 includes a base 28 configured to be joined to a wall of an electronic enclosure (such as the top, bottom, or side) or to a bracket or other fastener within the enclosure. Housing 18 also has a top 30 opposite base 28. The housing 18 has a first sidewall 32 and a second sidewall 34 extending from the base 28 to the top 30. Adhesive layer 56 is disposed on base 28 and aids in attachment of the filter to the electronic device housing.

Referring now to FIG. 2B, housing 18 includes a recirculation filter chamber 40 into which an adsorbent media element 42 is placed. A porous covering 44 is generally placed over the recirculation filter chamber 40 to hold the adsorbent media 42 in position. A breather filter chamber 46, generally separate from the recirculation filter chamber 40, is also included in the filter housing 18. The breather filter chamber 46 is placed on the second chamber 24 of the filter housing 18, and is typically arranged such that it is in a low pressure area of an enclosure. Filter media 48 is disposed within the breather filter chamber 46 of the housing 18 and is retained by porous cover 49.

A diffusion channel 50 couples an inlet port 52 and the breather filter chamber 46. Diffusion channel 50 reduces the amount of unwanted vapor contamination reaching the filter media 48 from outside the electronic housing. A seal 54 is placed alongside the diffusion channel 50 to close off the diffusion channel. In another embodiment, the seal may be constructed from a porous or non-porous adhered adhesive material.

Typically, the two chambers of the filter housing 18 are formed simultaneously. Methods of forming the filter housing 18 include, but are not limited to, injection molding and compression molding. In some arrangements, an adhesive layer 56 is disposed on the base 28 of the housing 18. For example, the adhesive layer 56 may be positioned on a flat surface of the filter construction, effectively securing the filter in place. When such is the case, generally a low outgassing, permanent, acrylic, pressure sensitive adhesive (PSA) is used. Suitable adhesives are those available from 3M Company of St. Paul, Minn. under the designation 467MS.

In operation, airflow generated by a spinning disk will force air onto the surface of the first chamber forming a high-pressure zone. The proximity and orientation of the adsorbent media in this chamber is ideal to clean up the air spinning around the drive. Because the airflow is partially blocked by the first chamber 22 of the filter, the second chamber 24 of the filter may be in a low-pressure zone relative to the first chamber 22. Thus, a pressure gradient is established across the filter assembly based on the interaction between the predominant direction of the airflow in the drive enclosure and the physical arrangement of the filter within the housing. The low-pressure zone is ideal for a breather filter because air entering the disk drive will enter through the filter assembly and not through other openings or leaks in the enclosure. The inside of the filter is configured such that there is no airflow from the first chamber 22 to the second chamber 24 and so that the path to the outside of the drive is only available through the second chamber 24.

Figure 3:
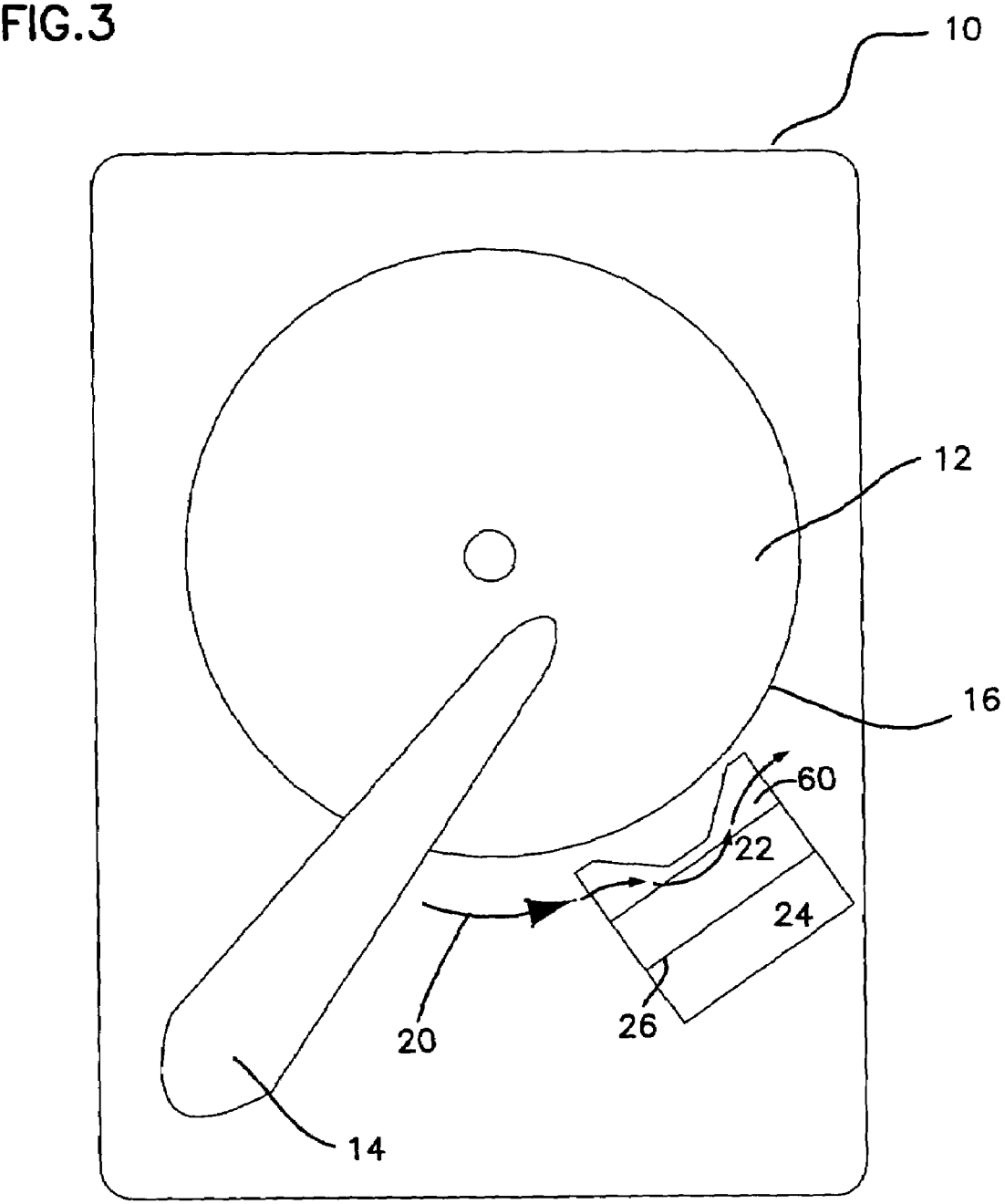
FIG. 3 is a top plan view of a data storage device incorporating an alternative embodiment of the invention.

Modifications and improvements may be made to the invention. For example, the filter assembly may include a recirculation filter holder in the housing, so that another filter could be integrated into the filter assembly. Alternatively, the housing could be configured to further enhance the airflow effects mentioned above. An example of these enhanced airflow effects is displayed in the schematic drawing in FIG. 3. A shroud 60 further enhances the airflow effects around the filter. An additional port may be located in the base of the filter.

Figure 4:
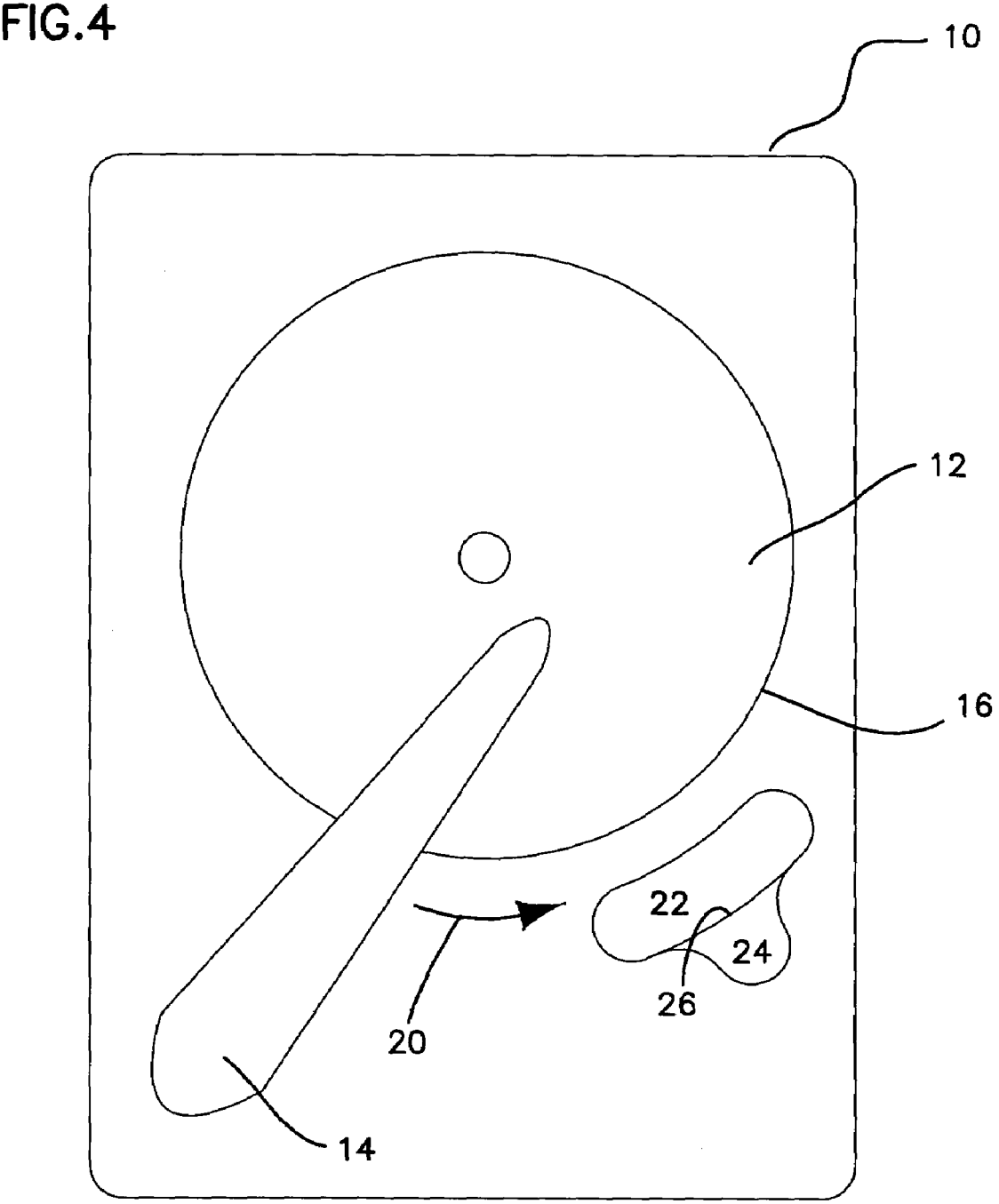
FIG. 4 is a top plan view of a data storage device incorporating an alternative configuration for the first and second chambers of a filter assembly constructed and arranged in accordance with the invention.
Figure 5:
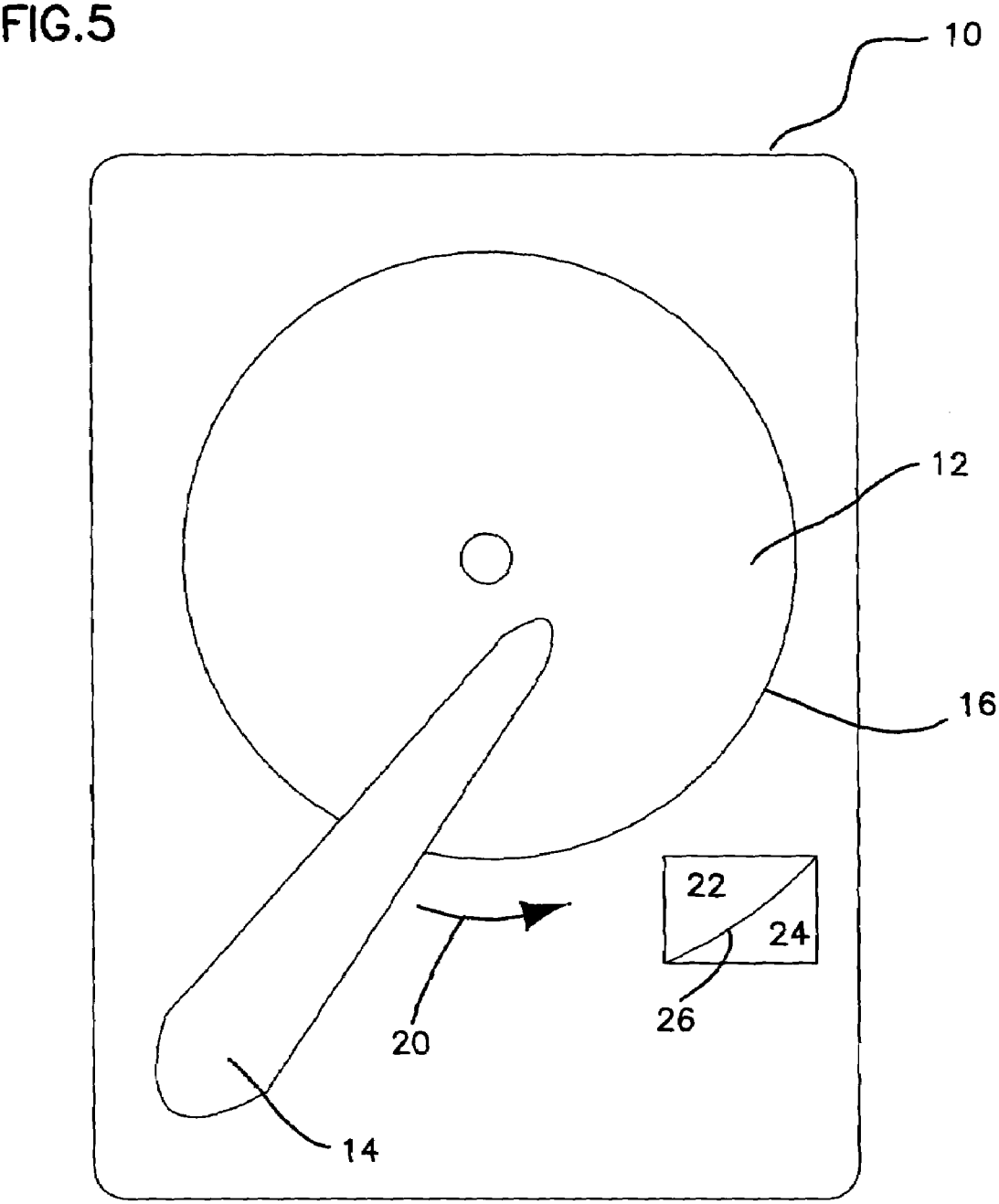
FIG. 5 is a top plan view of a data storage device incorporating another alternative configuration for the first and second chambers of a filter assembly constructed and arranged in accordance with the invention.

The first chamber 22 and the second chamber 24 of the filter may take on many different configurations. As shown in FIG. 4, the first chamber 22 may take on a more elongated shape. In this configuration, the second chamber 24 is in a position even more remote from the main airflow path 20. As before, the first chamber 22 and the second chamber 24 are physically separated by interior wall 26. As shown in FIG. 5, the shape of the interior wall 26 may vary and help to define the shape of the first chamber 22 and the second chamber 24. The curved shape of the interior wall 26 of this embodiment may help to define an airflow path through the adsorbent media element 42 (not shown) of the first chamber 22.

Those skilled in the art that will appreciate that many different filter designs in accordance with the present invention are possible. This is because there are many different ways to design a filter that will have one portion in a higher-pressure area and another portion in a lower-pressure area. Moreover, there are many different places within the electronic enclosure that such a multi-functional filter can be placed. While the Figures discussed above have shown that the filter is located in the lower right-hand corner of the drive enclosure, in practice, the filter can be located in many different spots within the drive enclosure. Typically, the recirculation portion of the multifunctional filter will be positioned in the path of the air currents inside the drive enclosure.

The filter media is typically configured for suitability as a breather filter and may have collection efficiency over a wide range of particle sizes including submicron to macroscopic sizes (preferably greater than or equal to 0.02 micrometers). Breather filter media can, and typically does, include particulate filter media and adsorbent filter media. The porous membrane filters are comprised, in part, of particulate filter media. Many adequate particulate filter medias currently exist and have adequate flow and resistance properties that are required. Suitable media materials include microfiberglass media and membrane materials such as, but not limited to, expanded polytetrafluoroethylene membrane, polypropylene membrane, polycarbonate and polyester membranes, mixed-esters of cellulose membrane, polyvinyl chloride membrane, cellulose triacetate membrane, and thin film composite membranes and/or laminates thereof. An especially suitable filtering layer is expanded polytetrafluoroethylene (PTFE) because of its good filtration performance, conformability to cover adsorbent layers, and cleanliness.

A preferred expanded PTFE membrane has a filtration efficiency of 99.99% at 0.1 micrometer diameter sized particles with a resistance to airflow of approximately 20 mm water column at an airflow of 10.5 feet per minute face velocity. Expanded PTFE is commercially available under the registered trademark GORE-TEX® of W. L. Gore & Associates, Inc.

The adsorbent media may be selected from a broad range of adsorbents and is tailored to the particular gas or gases that are of concern. These gases include water vapor, dioctyl phthalate, silicone, chlorine, hydrogen sulfide, nitrogen dioxide, mineral acid gases, hydrocarbon compounds and any other gas that can oxidize or cause corrosion of any critical element or that can condense onto critical elements so as to effect their operation. The adsorbent media selected may be of a single type, or a combination of different types. It may be a specifically selected adsorbent that targets a specific gas or may be a broad based adsorbent that has good adsorption properties over a wide range of gases.

Adsorbent materials include physisorbents such as, but not limited to silica gel, activated carbon, activated alumina, molecular sieves, or drying agents such as clays or super adsorbent fibers; or chemisorbents such as, but not limited to calcium carbonate, calcium sulfate, potassium permanganate, sodium carbonate, potassium carbonate, sodium phosphate, powdered or activated metals or other reactants for chemically reacting and scavenging gas phase corroding materials or contaminants.

If a combination of adsorbents are used, they may be individual layers that are positioned on top of each other, or mixed into one layer. Alternatively, the adsorbent media may be one that has been impregnated with one or more additional adsorbents such as, but not limited to, activated carbons, silica gels or aluminas that have been impregnated with one or more chemisorbents as mentioned above. A preferred broad range adsorbent is activated carbon with a wide pore size distribution that has been impregnated with one or more chemisorbents such as calcium carbonate or sodium carbonate. Not all of the carbon's pores need be taken up with the impregnation. To fabricate a broad based physisorbent, a wide pore size distribution may be used to provide for a broad range of gasses to be adsorbed. The carbonates are typically good impregnation candidates because the compounds being released due to the chemical reaction of the chemisorbents are carbon dioxide, oxygen, and water. A preferred adsorbent for a given contaminant depends upon the contaminant, the pore size of the physisorbent and chemical composition of the chemisorber that is selected so as to optimize performance on that particular contaminant.

The adsorbent media may include, but is not limited to, one or more of the following constructions: 100% adsorbent material such as a granular adsorbent, a carbonized woven or nonwoven material, and adsorbent impregnated nonwoven such as cellulose or polymeric nonwoven that may include latex, acrylic or some other binder system, porous cast adsorbents that may include polymers or ceramics to keep their porous structure, adsorbent impregnated polymers or polymer membranes that serve as a porous scaffold in which void spaces within the scaffold are filled with an adsorbent. Polymeric scaffolds include, but are not limited to, expanded PTFE membranes, polypropylene membranes, polyethylene membranes, polypropylene membranes, polyethylene membranes, polyvinylidene fluoride membranes, polyvinyl alcohol membranes, poly (ethylene teraphthalate) membranes and membranes from any other polymer that can be made to have a node and fibril structure.

A preferred embodiment of the scaffold of the adsorbent media is the use of expanded porous polytetrafluoroethylene (PTFE) made in accordance with the teachings of U.S. Pat. Nos. 3,953,566, and 4,187,390, commercially available from W. L. Gore & Associates, Inc. This membrane has a matrix structure that is capable of impregnation with one or more adsorbent materials. The impregnated PTFE is particularly desirable because the adsorbent material is well contained so as to minimize any shedding and is done without the use of binders that may later outgas and cause problems. A layer of impregnated PTFE is also desirable because it can be made extremely thin having a thickness of less than 0.001 inches (0.0025 cm) thus being adaptable to fit extremely low profile applications.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

I claim:

1. A filter, comprising:
   (a) a housing comprising a base, a top, and at least one sidewall extending from the base to the top, the housing defining a first chamber and a second chamber separate from the first chamber, the housing also defining an inlet port in fluid communication with the second chamber, the inlet port located in the base of the housing;
   (b) adsorbent media disposed within the first chamber of the housing;
   (c) filter media disposed within the second chamber of the housing; and
   (d) a porous membrane disposed over at least a portion of the first chamber and a porous membrane disposed over at least a portion an opening of the second chamber;
       wherein the filter media disposed in the second chamber is retained by a porous cover.

2. The filter according to claim 1, wherein the housing is configured for insertion into an electronic device enclosure with the first chamber in a region of higher air pressure than the second chamber during operation of the electronic device.

3. The filter according to claim 1, wherein the housing defines a path for flow of fluid through the inlet port, into contact with the filter media in the second chamber, and out the second chamber.

4. The filter of claim 1, wherein the housing further defines a diffusion channel coupling the inlet port and the second chamber.

5. The filter of claim 1, wherein the housing comprises a non-porous material.

6. The filter of claim 1, wherein the porous membrane comprises a polytetraflouroethylene membrane.

7. The filter of claim 1, further comprising a mounting adhesive disposed on the base of the housing.

8. The filter of claim 1, wherein the filter media comprises carbon filter material.

9. The filter of claim 1, wherein the adsorbent media comprises an adsorbent material selected from the group consisting of activated carbon, impregnated carbon, activated alumina, molecular sieves, silica gel, silica, and combinations thereof.

10. The filter of claim 1, wherein the housing further comprises an interior wall separating the first chamber from the second chamber.

11. A data storage device assembly comprising:
    (a) an enclosure;
    (b) at least one disk rotatably mourned within the enclosure; and
    (c) a filter construction positioned within the enclosure, the filter construction comprising:
        (i) a housing comprising a base, a top, and at least one sidewall extending from the base to the top, the housing defining a first chamber and a second chamber separate from the first chamber, the housing also defining an inlet port for the second chamber, the inlet port located in the base of the housing;
        (ii) adsorbent media disposed within the first chamber of the housing; and
        (iii) filter media disposed within the second chamber of the housing,
        (iv) a porous membrane disposed over at least a portion of an opening in the first chamber; and a porous membrane disposed over at least a portion of the second chamber; and
    wherein the filter media disposed in the second chamber is retained by a porous cover.

12. The disk drive assembly according to claim 11, wherein the first chamber is positioned facing the at least one disk.

13. The disk drive assembly according to claim 11, wherein the filter construction is oriented such that the second chamber is located on the side of the filter facing opposite the disk.

14. A method for protecting an electronic device from contaminants, the method comprising:
    (a) positioning a filter construction inside an electronic device housing, the filter construction comprising:
        (i) a housing comprising a base, a top, and at least one sidewall extending from the base to the top, the housing defining a first chamber and a second chamber separate from the first chamber, a the housing also defining an inlet port for the second chamber, the inlet port located in the base of the housing;
        (ii) adsorbent media disposed within the first chamber of the housing;
        (iii) filter media disposed within the second chamber of the housing; and
    (b) removing contaminants using the filter media and adsorbent media;
        wherein the filter media disposed in the second chamber is retained by a porous cover.

15. The method of claim 14, wherein the filter construction is oriented such that the first chamber is exposed to a higher air pressure region within the electronic device housing than the second chamber during operation of the electronic device.

16. The method of claim 14, wherein high pressure is generated by rotation of at least one disk.

17. The method of claim 14, wherein fluid enters the first chamber and contacts the adsorbent media.

18. The method of claim 14, wherein fluid enters the second chamber through the inlet port and contacts the filter media.

* * * * *